US012190735B2

(12) United States Patent
Butler

(10) Patent No.: US 12,190,735 B2
(45) Date of Patent: Jan. 7, 2025

(54) TESTING A SCHEDULING SYSTEM FOR AUTONOMOUS VEHICLES USING SIMULATIONS

(71) Applicant: Waymo LLC, Mountain View, CA (US)

(72) Inventor: Cindy Cao Butler, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 515 days.

(21) Appl. No.: 17/354,395

(22) Filed: Jun. 22, 2021

(65) Prior Publication Data

US 2022/0406192 A1    Dec. 22, 2022

(51) Int. Cl.

| G08G 1/123 | (2006.01) |
|---|---|
| B62D 6/00 | (2006.01) |
| G01C 21/00 | (2006.01) |
| G01C 21/36 | (2006.01) |
| G05D 1/02 | (2020.01) |
| G06F 9/455 | (2018.01) |
| G06F 11/36 | (2006.01) |
| G06F 30/20 | (2020.01) |
| G08G 1/00 | (2006.01) |
| G06F 119/02 | (2020.01) |

(52) U.S. Cl.
CPC .............. *G08G 1/202* (2013.01); *B62D 6/00* (2013.01); *G06F 30/20* (2020.01); *G06F 2119/02* (2020.01)

(58) Field of Classification Search
None
See application file for complete search history.

(56) References Cited

U.S. PATENT DOCUMENTS

| 2017/0185087 | A1* | 6/2017 | Petroff ................. G05D 1/0088 |
|---|---|---|---|
| 2019/0066409 | A1 | 2/2019 | Moreira Da Mota |
| 2019/0179738 | A1* | 6/2019 | Hawthorne .......... G06F 11/3664 |
| 2019/0265703 | A1 | 8/2019 | Hicok et al. |
| 2019/0310654 | A1* | 10/2019 | Halder ................. G05D 1/0088 |
| 2020/0126417 | A1* | 4/2020 | Selvam .................. G06Q 50/30 |
| 2020/0319651 | A1 | 10/2020 | Nagy et al. |
| 2020/0363223 | A1* | 11/2020 | Abrams ............. G01C 21/3438 |
| 2020/0409369 | A1* | 12/2020 | Zaytsev ............... G05D 1/0212 |
| 2022/0326032 | A1* | 10/2022 | Liemhetcharat ....... G06Q 50/30 |

* cited by examiner

*Primary Examiner* — Adam D Tissot
*Assistant Examiner* — Michael T Silva
(74) *Attorney, Agent, or Firm* — Botos Churchill IP Law

(57) ABSTRACT

Aspects of the disclosure provide for the evaluation of a scheduling system software for managing autonomous vehicle scheduling and dispatching. For instance, a problem condition for a simulation may be identified. The simulation may be run using the identified problem condition. The simulation may include a plurality of simulated autonomous vehicles each utilizing its own autonomous vehicle control software and map information common to each simulated autonomous vehicle. The problem condition may relate to a particular simulated autonomous vehicle of the plurality. Output of the simulation may be analyzed to determine a score for the scheduling system software. The scheduling system software may be evaluated using the score.

20 Claims, 8 Drawing Sheets

TESTING A SCHEDULING SYSTEM FOR AUTONOMOUS VEHICLES USING SIMULATIONS

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. The autonomous control software used by these vehicles to operate in the autonomous mode may sometimes be tested and validated before such software is actually used to control the vehicles in areas where the vehicles are interacting with other objects.

Such testing may often involve simulations which may include simulations which are run using log data collected by a vehicle operating in an autonomous mode over some brief period of time. The log data may include information from the vehicle's various systems including perception, routing, planning, positioning, etc. At the same time, the actual vehicle is replaced with a simulated vehicle which can make decisions using the autonomous control software. By doing so, the software can be rigorously tested. For instance, the simulations may be used to determine whether a particular type of event or interaction with another agent has occurred, such as a particular type of behavior, collision, or near collision. As an example, these events and interactions may be used for various purposes, such as determining whether the software can be rigorously tested to determine whether the software can "pass" a given simulation without a collision or near collision without requiring a vehicle to physically drive "real" miles or having to "manufacture" situations in the real world.

BRIEF SUMMARY

Aspects of the disclosure provide a method of evaluating scheduling system software for managing autonomous vehicle scheduling and dispatching. The method includes identifying, by one or more processors, a problem condition for a simulation, the problem condition relating to a particular simulated autonomous vehicle of a plurality of simulated autonomous vehicles; running, by the one or more processors, the simulation using the identified problem condition, the simulation including the plurality of simulated autonomous vehicles each utilizing its own autonomous vehicle control software and map information common to each simulated autonomous vehicle; analyzing, by the one or more processors, output of the simulation to determine a score for the scheduling system software; and evaluating, by the one or more processors, the scheduling system software using the score.

In one example, the problem condition includes a delay in a passenger meeting the particular simulated autonomous vehicle of the plurality. In another example, the problem condition includes the particular simulated autonomous vehicle of the plurality encountering a failure. In another example, the problem condition includes the particular simulated autonomous vehicle of the plurality being in an accident. In another example, determining the score is based on whether each of the simulated autonomous vehicles of the plurality other than the particular simulated autonomous vehicle reach respective destinations of each of the simulated autonomous vehicles of the plurality other than the particular simulated autonomous vehicle. In this example, determining the score is based on differences in estimated times of arrival at each of the respective destinations before and after the problem condition occurs in the simulation. In another example, using the identified problem condition includes providing a notification of the problem condition to the scheduling system software during the simulation. In another example, the simulation involves at least some of the plurality of simulated autonomous vehicles picking up and dropping off users of a transportation service at different locations in a service area for the transportation service. In another example, evaluating the scheduling system software includes comparing the score to a score of a second version scheduling system software, different from the scheduling system software.

Another aspect of the disclosure includes a system for evaluating scheduling system software for managing autonomous vehicle scheduling and dispatching. The system includes a simulation system including one or more computing devices configured to identify a problem condition for a simulation, the problem condition relating to a particular simulated autonomous vehicle of a plurality of simulated autonomous vehicles; run the simulation using the identified problem condition, the simulation including the plurality of simulated autonomous vehicles each utilizing its own autonomous vehicle control software and map information common to each simulated autonomous vehicle; analyze output of the simulation to determine a score for the scheduling system software; and evaluate the scheduling system software using the score.

In one example, the problem condition includes a delay in a passenger meeting the particular simulated autonomous vehicle of the plurality. In another example, the problem condition includes the particular simulated autonomous vehicle of the plurality encountering a failure. In another example, the problem condition includes the particular simulated autonomous vehicle of the plurality being in an accident. In another example, the one or more computing devices are configured to determine the score based on whether each of the simulated autonomous vehicles of the plurality other than the particular simulated autonomous vehicle reach respective destinations of each of the simulated autonomous vehicles of the plurality other than the particular simulated autonomous vehicle. In this example, the one or more computing devices are configured to determine the score based on differences in estimated times of arrival at each of the respective destinations before and after the problem condition occurs in the simulation. In another example, the one or more computing devices are configured to use the identified problem condition by providing a notification of the problem condition to the scheduling system software during the simulation. In another example, the simulation involves at least some of the plurality of simulated autonomous vehicles picking up and dropping off users of a transportation service at different locations in a service area for the transportation service. In another example, the one or more computing devices are configured to evaluate the scheduling system software by comparing the score to a score of a second version scheduling system software, different from the scheduling system software. In another example, the system also includes the scheduling system.

A further aspect of the disclosure provides a non-transitory computer-readable medium on which instructions are stored. The instructions, when executed by one or more processors cause the one or more processors to perform a method of evaluating scheduling system software for managing autonomous vehicle scheduling and dispatching. The method includes identifying a problem condition for a simulation, the problem condition relating to a particular simulated autonomous vehicle of a plurality of simulated autonomous vehicles; running the simulation using the identified problem condition, the simulation including the plurality of simulated autonomous vehicles each utilizing its own autonomous vehicle control software and map information common to each simulated autonomous vehicle; analyzing output of the simulation to determine a score for the scheduling system software; and evaluating the scheduling system software using the score.

DETAILED DESCRIPTION

Overview

Figure 1:
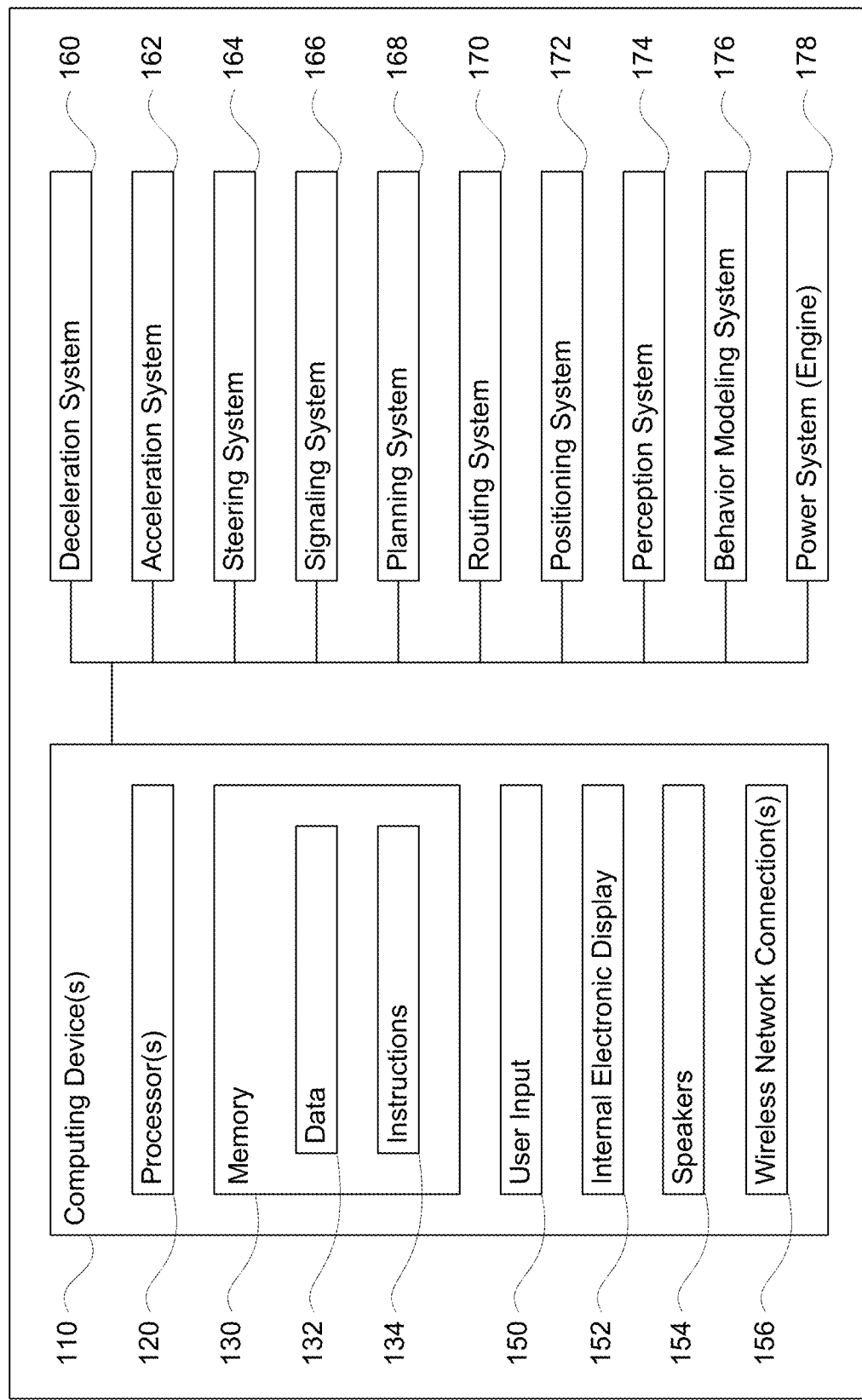
FIG. 1 is a functional diagram of an example vehicle in accordance with an exemplary embodiment.

The technology relates to evaluating a scheduling system, or rather scheduling system software, that manages autonomous vehicle scheduling and dispatching. This testing may involve creating abnormal and even failure situations in simulations to ensure efficiency and availability of services. Simulations may be used to test the software of autonomous vehicles, generally by creating a situation for a virtual autonomous vehicle in order to test the functionality of that particular vehicle. However, in order to test a scheduling system, many such virtual autonomous vehicles may be utilized.

This evaluating may involve setting up one or more simulations using a plurality of simulated autonomous vehicles each utilizing its own autonomous vehicle control software and map information common to each simulated autonomous vehicle. In this way, each autonomous vehicle in the simulation can respond to its environment and control itself in ways that more closely approximate reality. Each simulated autonomous vehicle may be initially assigned a location, a destination, and other characteristics such as speed parameters, weight, etc. Some of these destinations may be pickup or drop off locations for the simulated autonomous vehicles to pick up or drop off passengers or goods. Each simulated autonomous vehicle's control software may generate a route to the destination in order to control that autonomous vehicle to its destination. In this regard, each simulation may be a large-scale simulation that includes a plurality of pickup and drop off and/or delivery tasks in one service area.

In addition to the autonomous vehicles, the simulation may include a "scene" including static objects as well as dynamic road user traffic which autonomous vehicles might encounter in the real world. The scene could be fully virtual or log-based. For instance, a fully virtual scene could be generated based on the learned models from log data generated by recording data from autonomous vehicles. In some instances, this may be combined with other log data to generate the virtual scene. The scene could be fully virtual and generated automatically, or log-based.

Before running a simulation, a problem condition may be identified. The problem condition may be identified based on the particular aspect of the scheduling system software to be tested. For instance, if testing the scheduling system's ability to respond to an autonomous vehicle becoming unavailable, the problem condition may include an autonomous vehicle going out of service. As another example, if testing the scheduling system's ability to respond to a delay in a passenger meeting an assigned simulated autonomous vehicle, the problem condition may be that the autonomous vehicle will now be delayed on its assigned trip and potentially a later assigned trip. This may occur when the passenger is initially being picked up for a trip or alternatively, when the passenger is on a multi-stop trip where an assigned vehicle is waiting for the passenger at an intermediate stop.

When the simulation is run, the scheduling system software may receive a notification of the problem condition. In response, the scheduling system software may make any number of decisions. For example, if the problem condition involves a simulated autonomous vehicle encountering failure or accident while on its way to pick up a passenger, the scheduling system software may attempt to select another simulated autonomous vehicle to pick up the passenger. As another example, if the problem condition involves a delay in a passenger meeting an assigned simulated autonomous vehicle, the scheduling system software may eventually attempt to select another simulated autonomous vehicle to pick up the passenger and reassign the assigned simulated autonomous vehicle to another trip.

The output of the simulation may then be analyzed. This output may include information such as whether all of the simulated autonomous vehicles reached their assigned destinations and the difference in estimated times of arrival at those destinations before and after the problem condition occurs. These values may be used to determine a score for the scheduling system software, and the scores may then be used to assess different versions of the software.

The features described herein may allow for the testing and evaluation of scheduling system software, that manages autonomous vehicle scheduling and dispatching. As the business operations of autonomous vehicles will be different from the existing ride hailing services with human drivers may differ greatly, understanding how the scheduling system software responds to problem conditions is critical to building a robust and practical transportation service. Moreover, using multiple simulated autonomous vehicles is a safe and efficient (in terms of both monetary cost and time) way to assess different versions of the scheduling system software and to find solutions which best utilize autonomous vehicle resources and minimize delays to passengers. This simulation solution can also help any company to choose the operation model to maximize the income because the income does not go to the individual driver per ride, the income of rider-only service will be evaluated at the daily total rides level, or total income per miles by all the autonomous vehicles.

Example Systems

As shown in FIG. 1, an autonmous vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2:
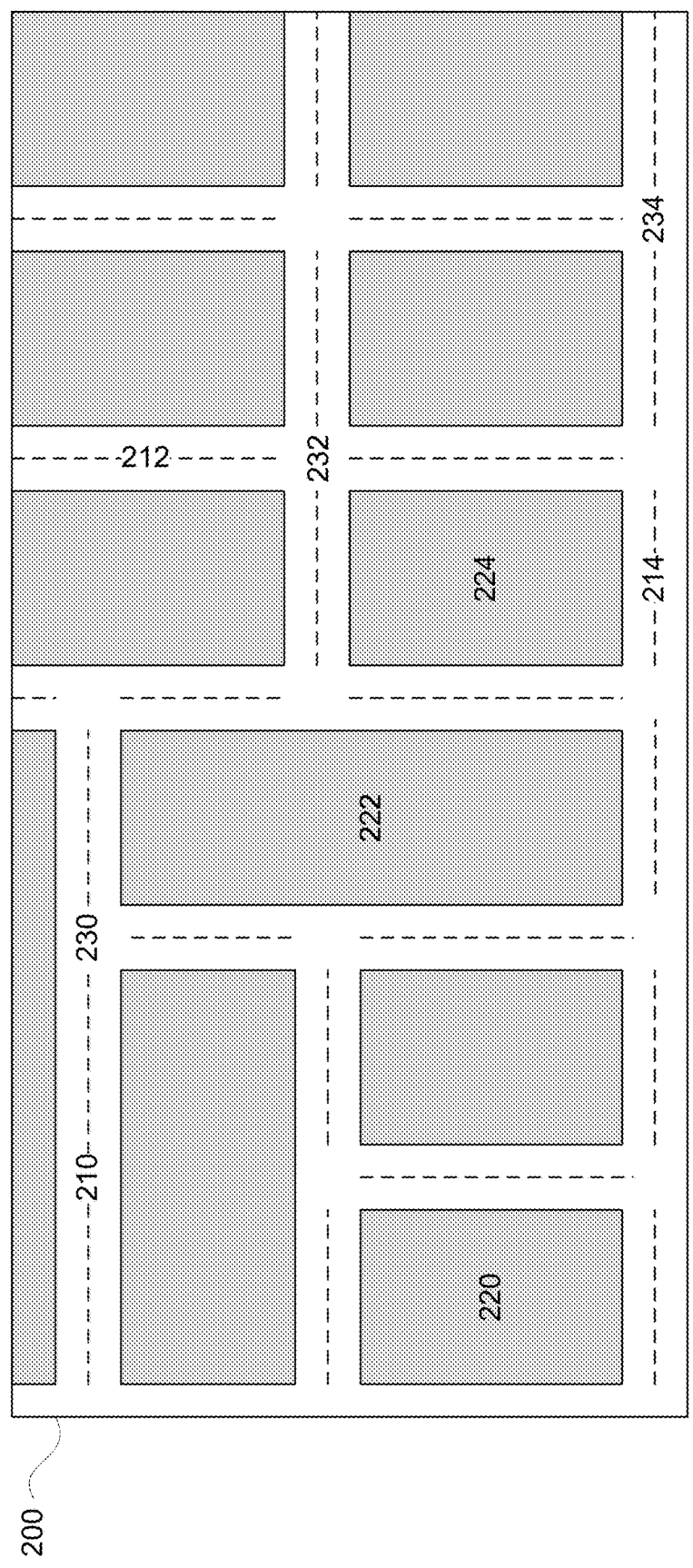
FIG. 2 is an example of map information in accordance with aspects of the disclosure.

FIG. 2 is an example of map information 200 for a section of roadway corresponding to a service area for autonomous vehicles such as vehicle 100. In this example, the map information 200 includes information identifying the shape, location, and other characteristics of lane lines represented by dashed-lines 210, 212, 214 designating roads or otherwise drivable areas, non-drivable areas (such as buildings, parks, etc.) represented by shaded areas 220, 222, 224, as well as intersections 230, 232, 234. Although only a few features are shown and identified, the map information 200 may be highly-detailed and include various additional features, including for instance the locations and boundaries of blockages as discussed further below. Although only few features are depicted in the map information 200 of FIG. 2, however, the map information 200 may include significantly more features and details in order to enable the autonomous vehicle 100 to be controlled in the autonomous driving mode.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
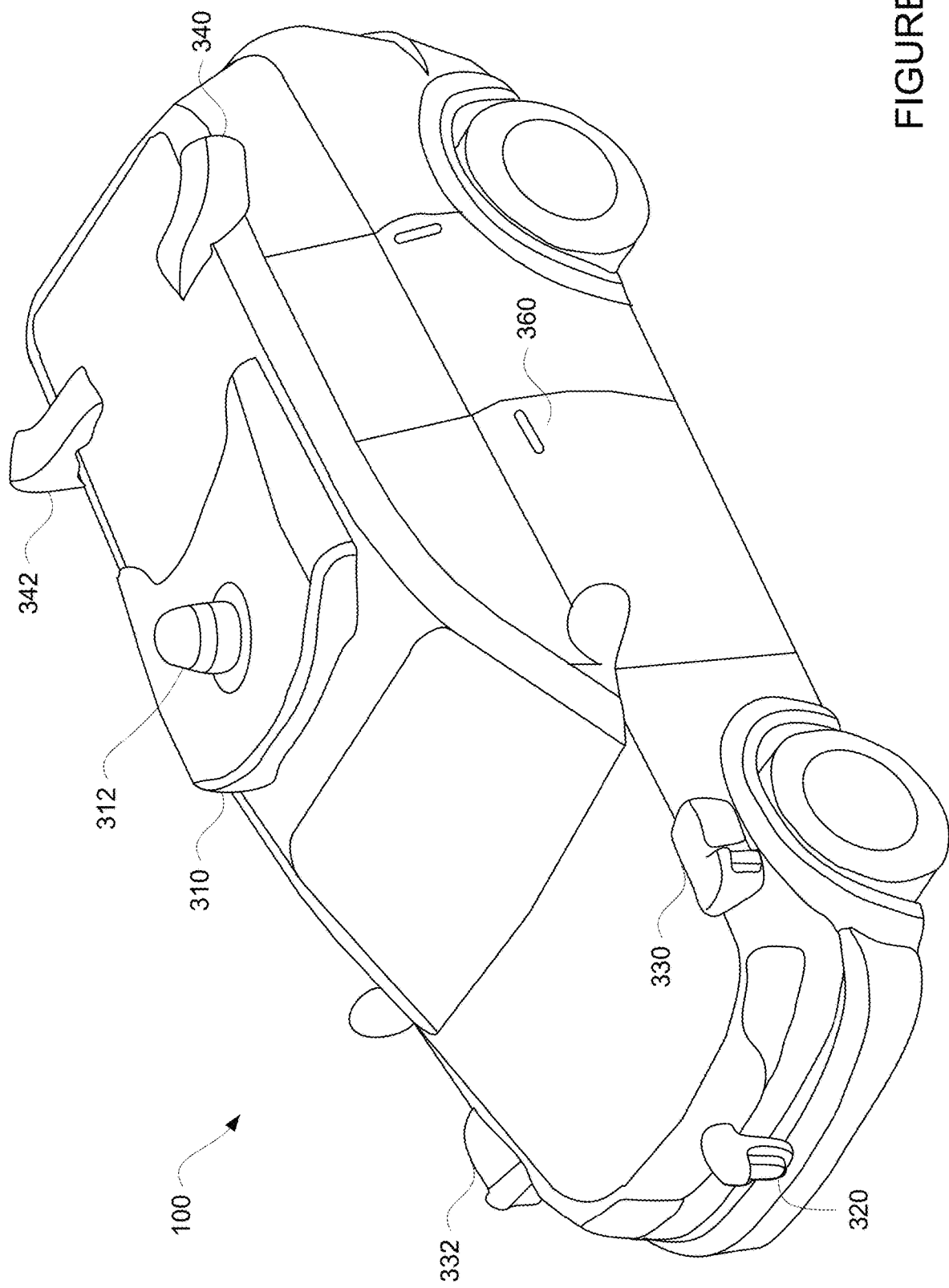
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
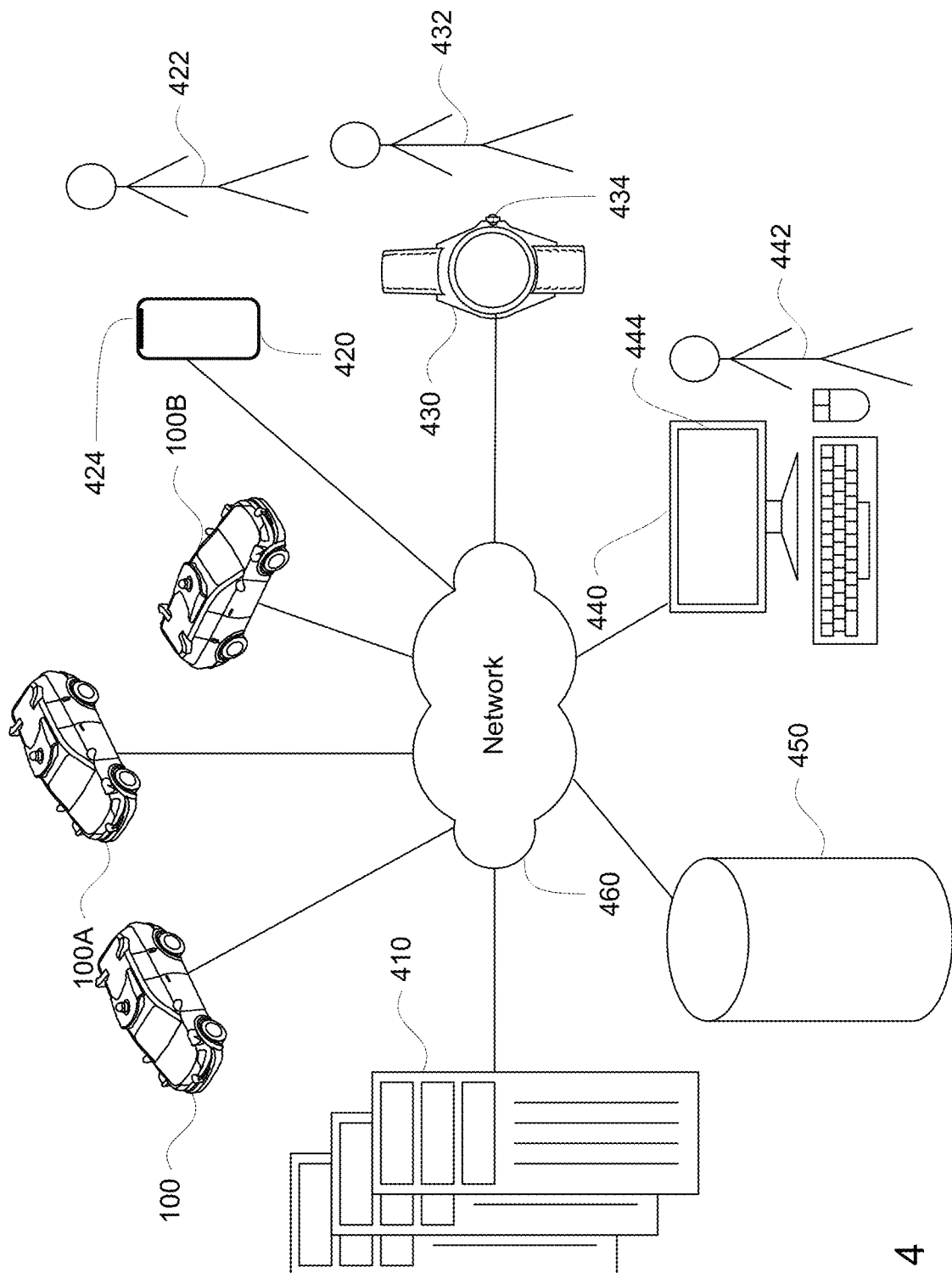
FIG. 4 is a pictorial diagram of an example system in accordance with aspects of the disclosure.
Figure 5:
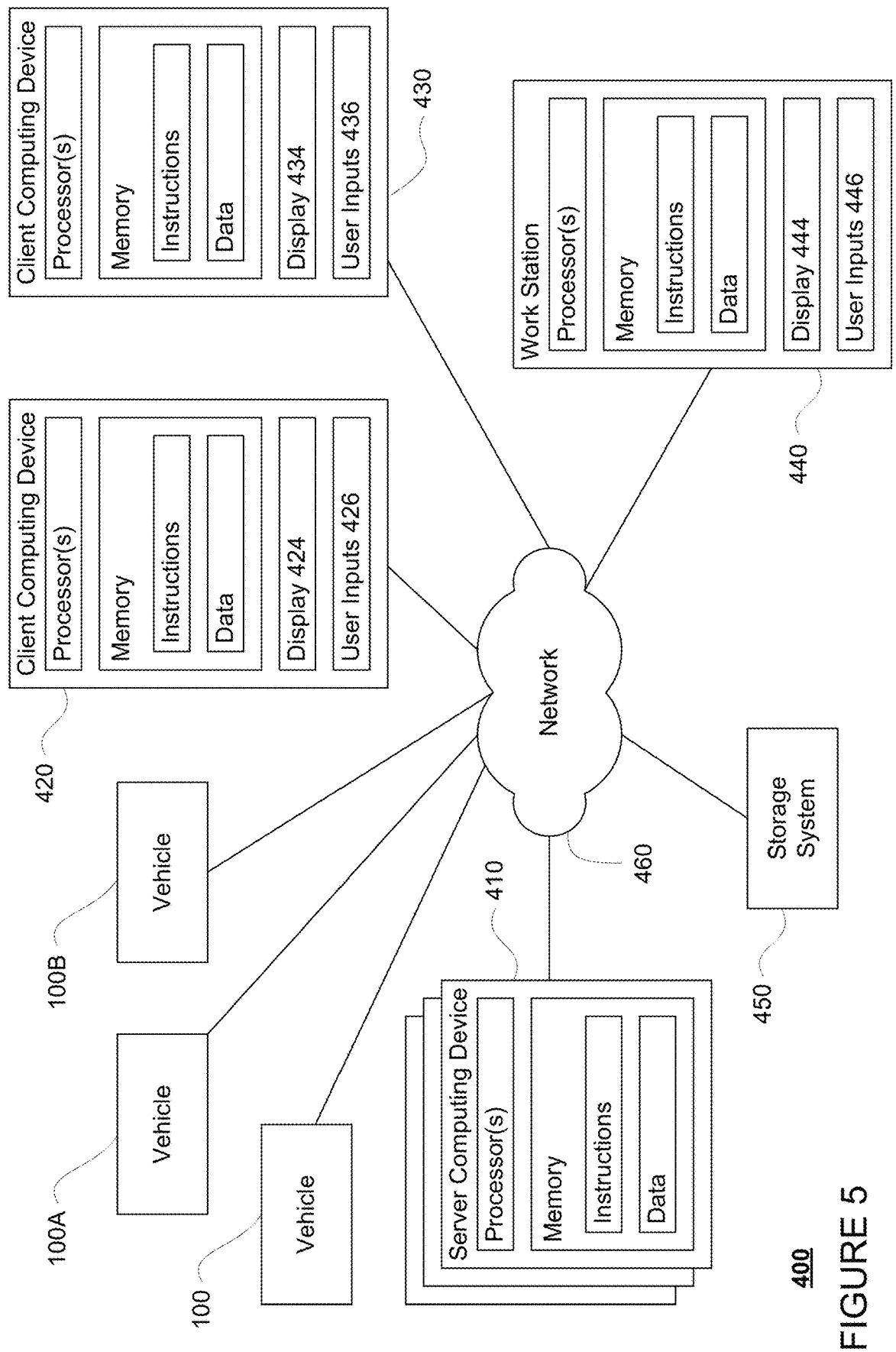
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be remote computing device used by a person (e.g. human operators or users 422, 432, 442) to review and analyze sensor data and other information generated by a perception system of a vehicle such as perception system 174 of vehicle 100. For example, user 442 may use the client computing device 440 to provide input to the simulation system 610 as discussed further below. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the storage system 450 may also store a version of the aforementioned detailed map information (e.g. the map information 200) including all or some of the features discussed above.

For instance, storage system 450 may store log data. This log data may include data generated by the various systems of a vehicle, such as vehicle 100, while the vehicle is being operated in a manual driving mode or an autonomous driving mode. For instance, the log data may include sensor data generated by a perception system, such as perception system 174 of vehicle 100. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc.

The log data may also include "event" data identifying different types of events such as collisions or near collisions with other objects, planned trajectories describing a planned geometry and/or speed for a potential path of the vehicle, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, planning, power, etc.) of the vehicle at different times including logged errors, inputs to and outputs of the various systems of the vehicle at different times, etc. In this regard, the log data may identify disengages, or events where an autonomous vehicle transitioned from an autonomous driving mode to a manual driving mode either automatically (e.g. if the vehicle's computing devices detect an internal error or another problem such as where the vehicle is approaching an unmapped area) or because a test driver in the vehicle took control of the vehicle.

Figure 6:
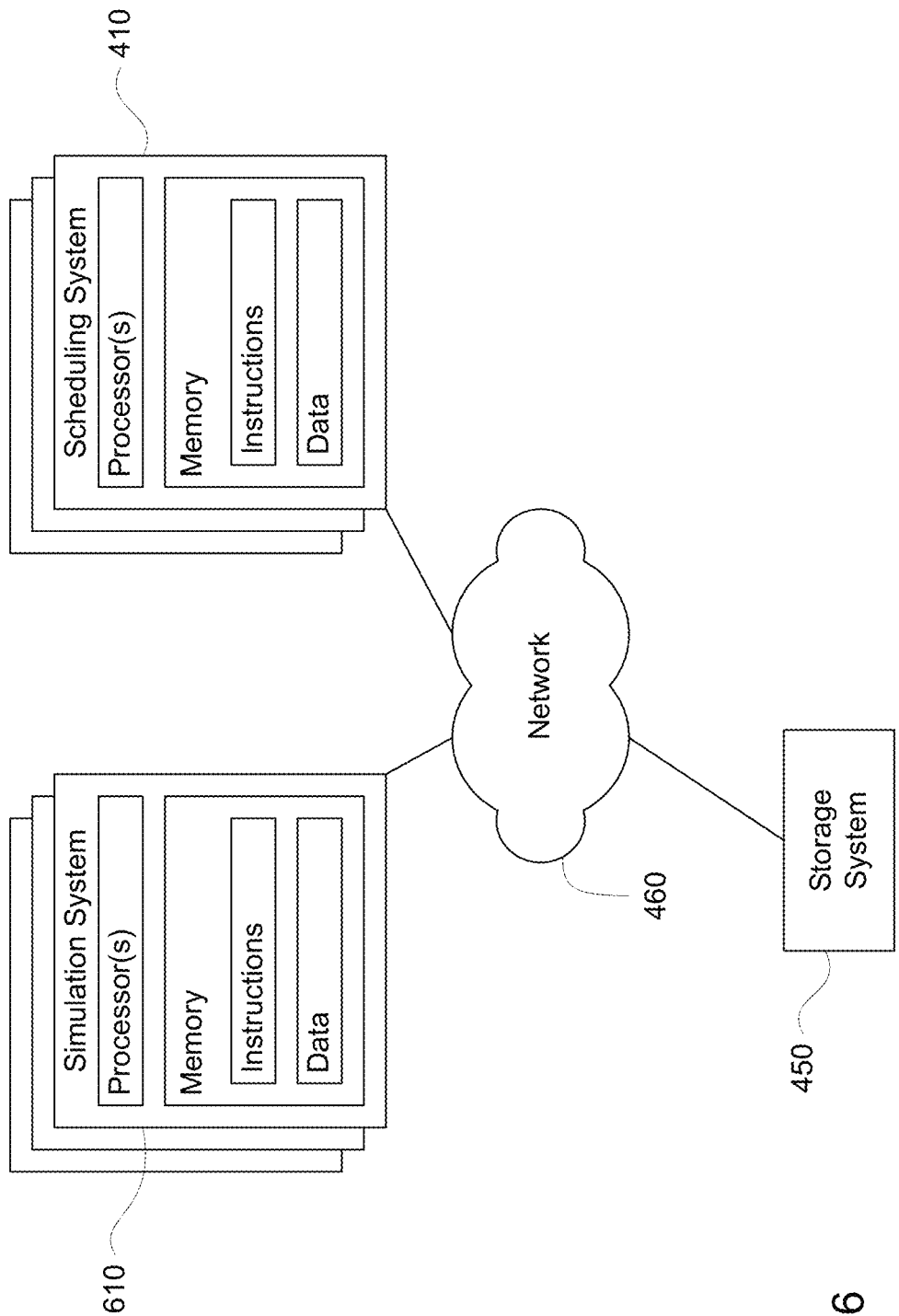
FIG. 6 is a functional diagram of a system in accordance with aspects of the disclosure.

In order to run the aforementioned simulations, a simulation system may be used to interact with the server computing devices 410. FIG. 6 depicts an example representation of a system including a simulation system 610 which can communicate with the computing devices 410 and storage system 450, for instance, via the network 460 or another network. In this regard, the simulation system may also be able to communicate with other computing devices, such as computing devices 420, 430 in order to receive input from a human operator such as user 442.

The simulation system 610 may be configured similarly to the server computing devices 410, and may therefore include one or more server computing devices each having one or more processors, memory, data and instructions. As with the server computing devices 410, such processors, memories, data and instructions may be configured similarly to one or more processors 120, memory 130, data 132, and instructions 134 of computing device 110. For instance, the simulation system 610 may include one or more server computing devices that are capable of simulating one or more autonomous vehicles operating using the aforementioned autonomous vehicle control software which can operate to control a respective simulated autonomous vehicle in an autonomous driving mode in a simulation in response to instructions from the server computing devices 410 (e.g. the scheduling system).

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
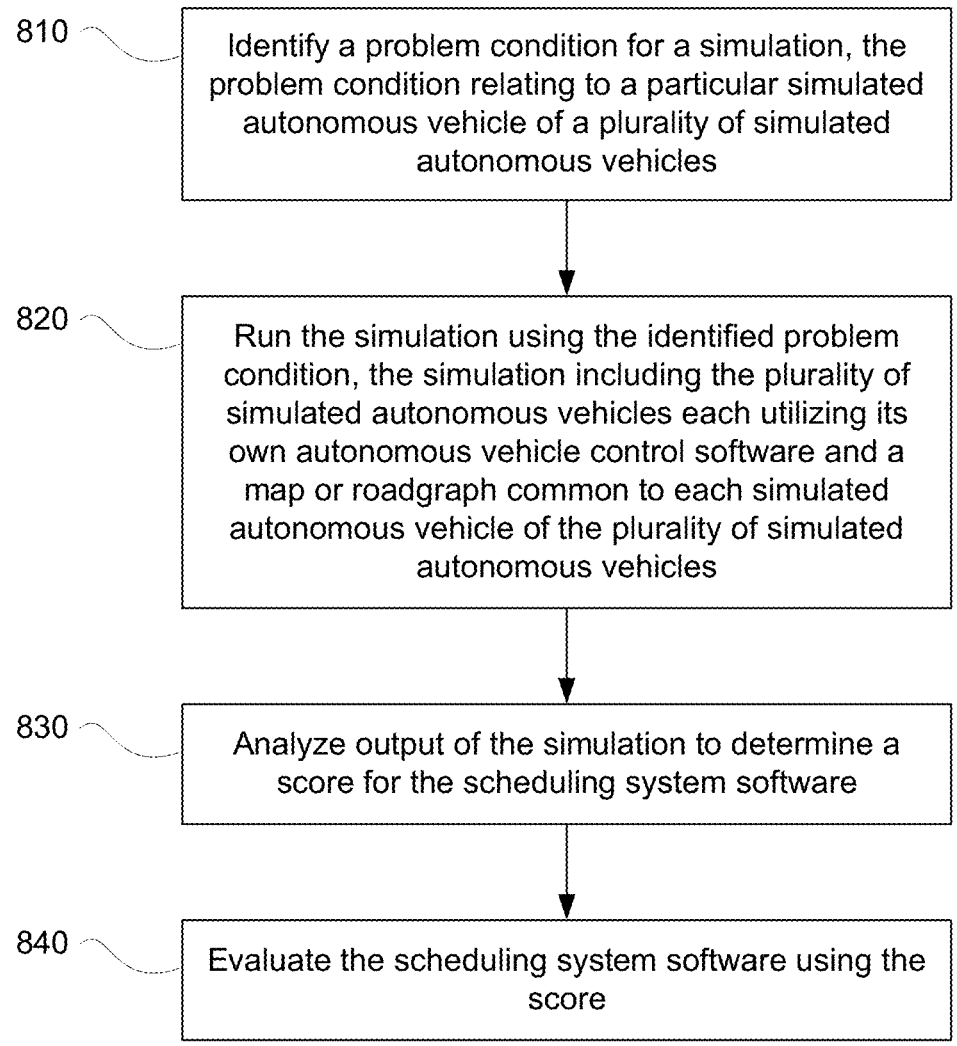
FIG. 8 is an example flow diagram in accordance with aspects of the disclosure.

FIG. 8 is an example flow diagram 800 for evaluating scheduling system software for managing autonomous vehicle scheduling and dispatching, which may be performed by one or more processors of one or more computing devices, such as the processors of the server computing devices 410 or the processors of any of the client computing devices 420, 430, 440. At block 810, a problem condition for a simulation is identified. The problem condition relates to a particular simulated autonomous vehicle of a plurality of simulated autonomous vehicles of the simulation. As noted above, the simulation system 610 may be capable of running multiple instances of the autonomous vehicle control software in order to simulation a plurality of autonomous vehicles in the simulation.

Before running a simulation, a problem condition may be identified. In this regard, a human operator of one of the computing devices 420, 430 may interact with the simulation system in order to enable the human operator to input information about the aspect of the scheduling system to be tested, initiate one or more simulations, etc. In this regard, the problem condition may be identified based on the particular aspect of the simulation system 610 software to be tested. For instance, if testing the scheduling system's ability to respond to an autonomous vehicle becoming unavailable, the problem condition may include an autonomous vehicle going out of service (for example, due to any type of condition such as an accident, hardware or software failure, etc.). As such, the scheduling system may need to arrange for other transportation for any passengers and potentially reschedule other trips. As another example, if testing the scheduling system's ability to respond to a delay in a passenger meeting an assigned simulated autonomous vehicle, the problem condition may be that the autonomous vehicle will now be delayed on its assigned trip and potentially a later assigned trip. As such the scheduling system may need to reschedule the passenger's trip and/or other trips to accommodate. This may occur when the passenger is initially being picked up for a trip or alternatively, when the passenger is on a multi-stop trip where an assigned vehicle is waiting for the passenger at an intermediate stop.

At block 820, the simulation is run using the identified problem condition. The simulation includes a plurality of simulated autonomous vehicles each utilizing its own autonomous vehicle control software and map information common to each simulated autonomous vehicle of the plurality of simulated autonomous vehicles. The simulation may involve utilizing a plurality of simulated autonomous vehicles each utilizing its own autonomous vehicle control software and map information common to each simulated autonomous vehicle. In this way, each autonomous vehicle in the simulation can respond to its environment and control itself in ways that more closely approximate reality. Each simulated autonomous vehicle may be initially assigned a staring location (e.g. current location of each autonomous vehicle at the start of the simulation), one or more destinations, and other characteristics such as speed parameters, weight, etc. Some of these destinations may be pickup or drop off locations for the simulated autonomous vehicles to pick up or drop off passengers or goods, a location for the autonomous vehicle to stop and wait (e.g. a staging area or depot for service, etc.), or other types of destinations. Each simulated autonomous vehicle's control software may generate a route to the destination in order to control that autonomous vehicle to its destination. In this regard, each simulation may be a large-scale simulation that includes a plurality of simulated autonomous vehicles each with one or more pickup and drop off locations and/or delivery tasks in one service area (e.g. a targeted testing area). In this regard, each simulation may allow for the testing of the scheduling system's ability to handle various problems in a targeted testing area.

In addition to the autonomous vehicles, the simulation may include a "scene" including static objects (such as parked vehicles, etc.) as well as dynamic road user traffic (such as other vehicles, bicyclists, pedestrians, etc.) which autonomous vehicles might encounter in the real world. The scene could be fully virtual or log-based. For instance, a fully virtual scene could be generated based on learned models from log data generated by autonomous vehicles as discussed above. In some instances, the log data itself may be combined with other data to generate the virtual scene. In such examples, additional static objects and/or dynamic road users can be "injected" into the log data as needed to achieve the particular goals of a simulation.

In this regard, a human operator of one of the computing devices 420, 430 may interact with the simulation system in order to enable the creation of such scenes. For instance, the creation of the scene may be done automatically in response to a human operator specifying parameters for the scene in a configuration file such as a number of autonomous cars, the service area, map information version to be used by the simulated autonomous vehicles, the problem condition, the number and interactions of dynamic agents, placement of static objects, etc. This configuration file may be processed by the simulation system in order to programmatically create a scene. The human operator can run a script command to invoke (presently or scheduled for a later time) the simulation system to generate the scenario, run the simulation, and perform any post simulation analysis.

In some instances, the simulation may involve more complex features or conditions. For instance, the virtual autonomous vehicles may be required to respond to simulated weather conditions and/or different road types. In this regard, the autonomous vehicle control software for the virtual autonomous vehicles may require that the operational design domain of the software is such that the autonomous vehicle control software is able to properly operate under such conditions.

Figure 7:
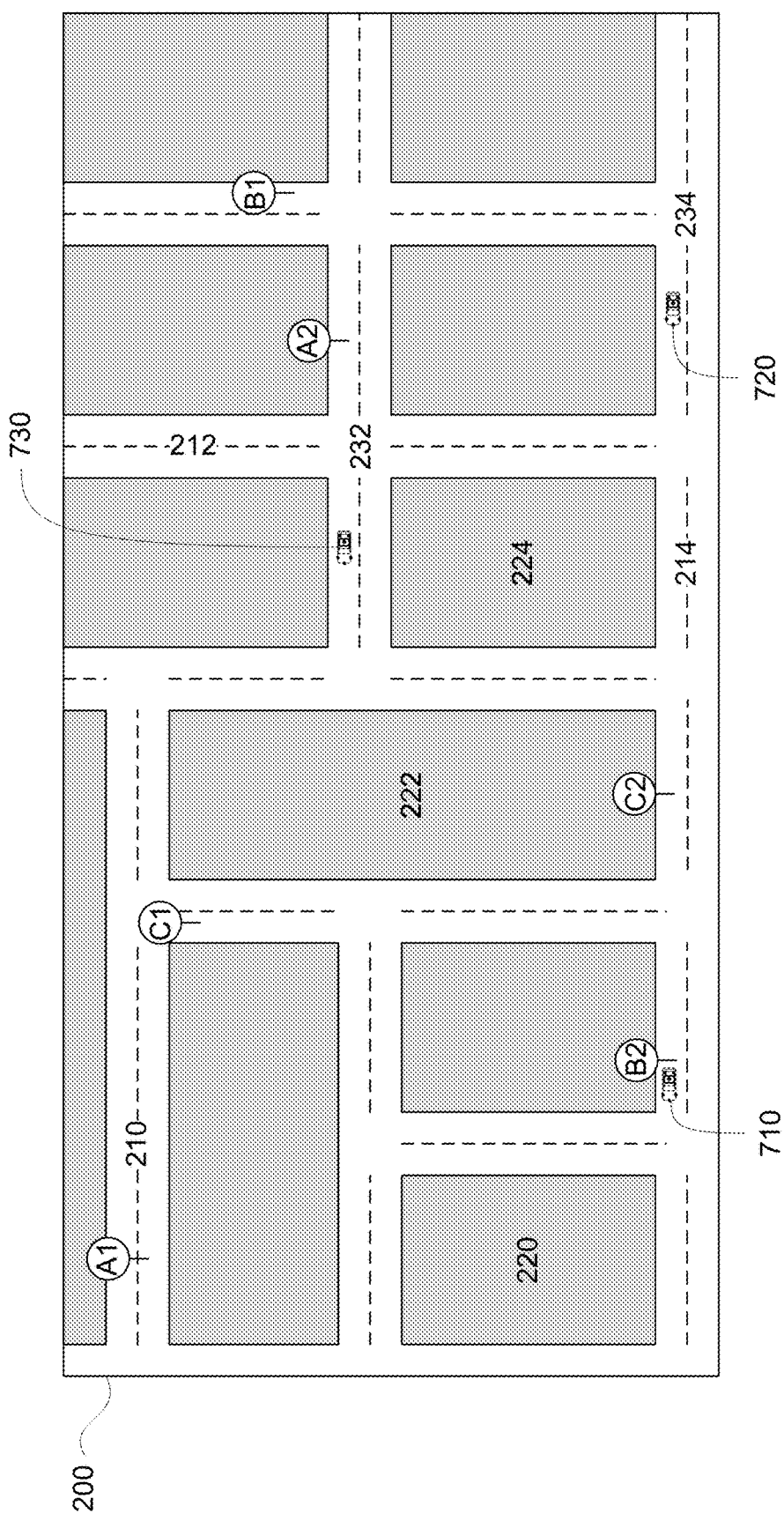
FIG. 7 is a representation of simulation data and map information in accordance with aspects of the disclosure.

FIG. 7 is a representation of simulation data and the map information 200. In this example, the simulation includes a plurality of pickup and drop off locations A1, A2, B1, B2, C1, C2 as well as a plurality of simulated autonomous vehicles 710, 720, 730, each being controlled using the aforementioned autonomous vehicle control software (and therefore functioning similarly to vehicle 100 within the simulation) as well as the map information 200. In this simulation, the scheduling system software may need to arrange trips between location A1 and A2, between locations B1 and B2, and between locations C1 and C2. As an example, simulated autonomous vehicle 710 may be assigned to a trip to pick up a passenger at location A1 and drop off that passenger at location A2, simulated autonomous vehicle 720 may be assigned to a trip to pick up a passenger at location B1 and drop off that passenger at location B2, and simulated autonomous vehicle 730 may be assigned to a trip to pick up a passenger at location C 1 and drop off that passenger at location C2. In addition, simulated autonomous vehicles 710 and 720 may be on their way to locations A1 and B1, respectively, to pick up passengers. In addition, simulated autonomous vehicle 730 may have already picked up a passenger at location C1 and is traveling towards the location C2 in order to drop off that passenger. While each respective simulated autonomous vehicle in the simulation will be able to detect and respond to its environment as discussed above, for simplicity, static and dynamic objects and other features such as traffic lights, etc. are included in the simulation are not depicted. The examples used in this simulation are merely for illustrative purposes only, and significantly more or less complex trips, numbers of trips, simulated autonomous vehicles, etc. may be used.

When the simulation is run, the scheduling system software may receive a notification of the problem condition.

For instance, when the simulation is running, the problem condition defined in the aforementioned configuration file, can be injected based on the location or timing of one of the simulated autonomous vehicles. The scheduling system may then receive a notification from the simulated autonomous vehicle (e.g. via a request for assistance, a periodic status update, via a request for a status update to the simulated autonomous vehicle by the scheduling system, or via some other application such as a notification generated automatically to appear like a request from a passenger of a vehicle for assistance).

In response, the scheduling system software may make any number of decisions. As noted above, the simulation system may identify a problem condition for the simulation. For instance, a problem condition may include a vehicle becoming unavailable. As an example, and referring to FIG. 7, any of the simulated autonomous vehicles 710, 720, 730 may become unavailable. In this example, if the problem condition involves a simulated autonomous vehicle encountering failure or accident while on its way to pick up a passenger, the scheduling system software may attempt to select another simulated autonomous vehicle to pick up the passenger. For example, if the simulated autonomous vehicle 710 become unavailable, the scheduling system software may select whether to assign simulated autonomous vehicle 720 to pick up the passenger at location A1 before picking up the passenger at location B 1, whether to assign simulated autonomous vehicle 730 to pick up the passenger at location A1 after dropping off simulated autonomous vehicle 730's current passenger, or whether to assign simulated autonomous vehicle 730 to pick up the passenger at location A1 after transporting the passenger at location B1 to location B2. This selection may be based on various factors, such as the proximity of other simulated autonomous vehicles, the overlap of the routes of each of the simulated autonomous vehicles, car pool preference of passengers, availability of autonomous vehicles to pick up the passenger, etc.

As another instance, if the problem condition involves a delay in a passenger meeting an assigned simulated autonomous vehicle, the scheduling system software may eventually attempt to select another simulated autonomous vehicle to pick up the passenger and reassign the assigned simulated autonomous vehicle to another trip. For example, if the passenger at location A1 is delayed, the scheduling system software may select whether to assign simulated autonomous vehicle 720 to pick up the passenger at location A1 and assign the simulated autonomous vehicle 710 to pick up the passenger at location B 1, whether to assign simulated autonomous vehicle 730 to pick up the passenger at location A1 after dropping off simulated autonomous vehicle 730's current passenger, whether to allow the simulated autonomous vehicle 710 to continue to wait for the passenger at location A1, etc. Again, this selection may be based on various factors, such as the proximity of other simulated autonomous vehicles, the overlap of the routes of each of the simulated autonomous vehicles, car pool preference of passengers, availability of autonomous vehicles to pick up the passenger, etc.

At block 830, output of the simulation is analyzed to determine a score for the scheduling system software. The output of the simulation may then be analyzed. This output may include information such as whether all of the simulated autonomous vehicles reached their assigned destinations and the difference in estimated times of arrival at those destinations before and after the problem condition occurs. These values may be used to determine a score for the scheduling system software.

For instance, the score may be determined as a combination of functionality evaluation and performance evaluation. For the functionality evaluation, pass/fail metrics may include whether a backup autonomous vehicle can reach the location of a failed autonomous vehicle to pick up a passenger ("reach_failure_location") as well as whether all passengers can reach their destinations before the simulation ends ("all_passengers_reach_destinations"). The success rates for each of reach_failure_location and all_passengers_reach_destinations may be determined from the results of the simulation as M1 and M2, respectively. As such, the functionality score may be defined as M1×M2. For the performance evaluation, the total cumulative delay ("P") from the planned arrival time of all passengers (e.g. the sum of all of the delays for each passenger) may be determined. In this regard, the larger the value of P, the worse the performance of the simulation system. As such, the performance value may be combined with the functionality score to determine a total score by M1×M2/(1+1/P). At block 840, the scheduling system software is evaluated using the score. For instance, the scores may then be used to assess different versions of the software. To evaluate the performance of any scheduling algorithm or business operational model, different metrics may be defined depending upon the goals of the transportation system. For example, the transportation system management (e.g. human operators of the transportation system) may define pass and/or fail metrics to evaluate the baseline functionalities of the scheduling system software such as whether and when all passengers reached their respective destinations. In addition or alternatively, transportation system management may define some performance metrics, based on whether the passenger in a simulated autonomous vehicle that becomes unavailable or is delayed can be delivered to the original destination on time or within an acceptable delay, whether any passengers in other vehicles can be delivered to their destinations on time, etc.

Multiple sets of simulations or test sets may be used to evaluate multiple problems. Each test set, may focus on simulating and evaluating a particular type of problem. In this regard, testing the scheduling of sending a backup autonomous vehicle to pick up the passengers from a failed autonomous vehicle will be a different type of problem from scheduling the autonomous vehicle has long waiting for a passenger at one of the stops to run other errands and later sending another autonomous vehicle to pick up the same passenger. For example, if a simulated autonomous vehicle has a failure, this can occur almost anywhere in the testing area, whereas delays caused by passengers will likely occur at or near pickup locations. Moreover, when there are passenger delays in ridesharing situations, can potentially have a greater impact on scheduling. Thus, the test sets for testing these problem conditions may be different. However, various situations belonging to the type of problem could be evaluated using same test set. For example, if the type of problem condition relates to a vehicle becoming unavailable, a failure caused by an accident caused by an external agent and a failure caused by the internal problem in some software or hardware system of the vehicle could be simulated in the same test set and share the same metrics.

The metrics may be aggregated, and the aggregated metrics for different versions of the software can be compared in order to identify any increases or decreases in the metrics between the different versions. To evaluate some particular business impact, one metric may be aggregated across all the simulations as the score (e.g. M1, M2, P, 1/P, (1+1/P), etc.). The aggregated scores from different metrics (e.g. total scores) can be used to help inform scheduling and other business decisions for the transportation service.

For example, if a test set utilizes 1000 simulations to evaluate a particular scheduling system software version, each simulation may produce data for each of the aforementioned metrics. If 500 of the 1000 simulations passed M1, and 400 of these 500 passed M1, the functionality score may be determined as 500/1000×400/500 or 0.5×0.8. In this example, the performance score may be calculated as all of the delays for the 400 simulations that passed both M1 and M2. As such, the total score may be determined from 0.5×0.8×(1+1/P). This total score may be compared to the total score for another version of the simulation system software.

The features described herein may allow for the testing and evaluation of scheduling system software that manages autonomous vehicle scheduling and dispatching. As the business operations of autonomous vehicles will be different from the existing ride hailing services with human drivers may differ greatly, understanding how the scheduling system software responds to problem conditions is critical to building a robust and practical transportation service. Moreover, using multiple simulated autonomous vehicles is a safe and efficient (in terms of both monetary cost and time) way to assess different versions of the scheduling system software and to find solutions which best utilize autonomous vehicle resources and minimize delays to passengers. This simulation solution can also help any company to choose the operation model to maximize the income because the income does not go to the individual driver per ride, the income of rider-only service will be evaluated at the daily total rides level, or total income per miles by all the autonomous vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    identifying, by one or more processors, a problem condition related to scheduling and dispatching of a fleet of autonomous vehicles, and the problem condition being associated with a particular autonomous vehicle of the fleet of autonomous vehicles;
    running, by the one or more processors using map information common to the fleet of autonomous vehicles, a first portion of a simulation for the fleet of autonomous vehicles;
    running, by the one or more processors using the map information, a second portion of the simulation including occurrence of the problem condition, the second portion of the simulation being subsequent to the first portion of the simulation;
    running, by the one or more processors using the map information, a third portion of the simulation including a response of a scheduling system to the occurrence of the problem condition, the third portion of the simulation being subsequent to the second portion of the simulation,
    wherein running the first portion, the second portion and the third portion of the simulation includes:
        generating, by respective autonomous vehicle control of each autonomous vehicle of the fleet of autonomous vehicles, a respective route to a respective destination;
        controlling, by the respective autonomous vehicle control of each autonomous vehicle of the fleet of autonomous vehicles, the autonomous vehicle along at least a portion of the respective route;
        simulating scheduling and dispatching of the fleet of autonomous vehicles by the scheduling system;
        determining, by the one or more processors, a score associated with the scheduling and dispatching of the fleet of autonomous vehicles by the scheduling system during at least the third portion of the simulation; and
        evaluating, by the one or more processors based at least on the score, one or more decisions by the scheduling system during at least the third portion of the simulation.

2. The method of claim 1, wherein the problem condition includes a delay in a passenger meeting the particular autonomous vehicle during at least the second portion of the simulation.

3. The method of claim 1, wherein the problem condition includes the particular autonomous vehicle encountering a failure of a component of the particular autonomous vehicle during at least the second portion of the simulation.

4. The method of claim 1, wherein the problem condition includes the particular autonomous vehicle being in an accident during at least the second portion of the simulation.

5. The method of claim 1, wherein determining the score is further based on whether each autonomous vehicle of the fleet of autonomous vehicles, other than the particular autonomous vehicle, reaches the respective destination.

6. The method of claim 5, wherein determining the score is further based on differences in estimated times of arrival at one or more of the respective destinations during the first portion of the simulation and estimated times of arrival at one or more of the respective destinations during the third portion of the simulation.

7. The method of claim 1, wherein running the second portion of the simulation includes providing a notification of the occurrence of the problem condition to the scheduling system.

8. The method of claim 1, wherein running the first portion, the second portion and the third portion of the simulation includes simulating picking up and dropping off, by one or more autonomous vehicles of the fleet of autonomous vehicles, users of a transportation service at different locations in a service area for the transportation service.

9. The method of claim 1, wherein evaluating the one or more decisions by the scheduling system includes comparing the score to another score associated with other simulated scheduling and dispatching of the fleet of autonomous vehicles by a different version of the scheduling system.

10. A system comprising a simulation system including one or more computing devices configured to:
- identify a problem condition related to scheduling and dispatching of a fleet of autonomous vehicles and associated with a particular autonomous vehicle of the fleet of autonomous vehicles;
- run, using map information common to the fleet of autonomous vehicles, a first portion of a simulation of the fleet of autonomous vehicles;
- run, using the map information, a second portion of the simulation including occurrence of the problem condition, the second portion of the simulation being subsequent to the first portion of the simulation;
- run, using the map information, a third portion of the simulation including a response of a scheduling system to the problem condition, the third portion of the simulation being subsequent to the second portion of the simulation,
- wherein the first portion, the second portion and the third portion of the simulation includes:
  - generation of, by respective autonomous vehicle control of each autonomous vehicle of the fleet of autonomous vehicles, a respective route to a respective destination;
  - control of, by the respective autonomous vehicle control of each autonomous vehicle of the fleet of autonomous vehicles, the autonomous vehicle along at least a portion of the respective route; and
  - simulation of scheduling and dispatching of the fleet of autonomous vehicles by the scheduling system;
- determine, a score associated with the scheduling and dispatching of the fleet of autonomous vehicles by the scheduling system during at least the third portion of the simulation; and
- evaluate, based at least on the score, one or more decisions by the scheduling system during at least the third portion of the simulation.

11. The system of claim 10, wherein the problem condition includes a delay in a passenger meeting the particular autonomous vehicle during at least the second portion of the simulation.

12. The system of claim 10, wherein the problem condition includes the particular autonomous vehicle encountering a failure of a component of the particular autonomous vehicle during at least the second portion of the simulation.

13. The system of claim 10, wherein the problem condition includes the particular autonomous vehicle being in an accident during at least the second portion of the simulation.

14. The system of claim 10, wherein the one or more computing devices are further configured to determine the score based on whether each autonomous vehicle of the fleet of autonomous vehicles, other than the particular autonomous vehicle, reaches the respective destination.

15. The system of claim 14, wherein the one or more computing devices are further configured to determine the score based on differences in estimated times of arrival at one or more of the respective destinations during the first portion of the simulation and estimated times of arrival at one or more of the respective destinations during the third portion of the simulation.

16. The system of claim 10, wherein the one or more computing devices are configured to, during the second portion of the simulation, provide a notification of the occurrence of the problem condition to the scheduling system.

17. The system of claim 10, wherein the one or more computing devices are configured to, during the first portion, the second portion and the third portion of the simulation, simulate picking up and dropping off, by one or more autonomous vehicles of the fleet of autonomous vehicles, users of a transportation service at different locations in a service area for the transportation service.

18. The system of claim 10, wherein the one or more computing devices are further configured to evaluate the one or more decisions by the scheduling system by comparing the score to another score of a different version of the scheduling system.

19. The system of claim 10, further comprising the scheduling system.

20. A non-transitory computer-readable medium on which instructions are stored, the instructions, when executed by one or more processors cause the one or more processors to perform a method comprising:
- identifying a problem condition related to scheduling and dispatching of a fleet of autonomous vehicles and associated with a particular autonomous vehicle of the fleet of autonomous vehicles;
- running, using map information common to the fleet of autonomous vehicles, a first portion of a simulation of the fleet of autonomous vehicles;
- running, using the map information, a second portion of the simulation including occurrence of the problem condition, the second portion of the simulation being subsequent to the first portion of the simulation;
- running, using the map information, a third portion of the simulation including a response of a scheduling system to the problem condition, the third portion of the simulation being subsequent to the second portion of the simulation,
- wherein running the first portion, the second portion and the third portion of the simulation includes:
  - generating, by respective autonomous vehicle control of each autonomous vehicle of the fleet of autonomous vehicles, a respective route to a respective destination;
  - controlling, by the respective autonomous vehicle control of each autonomous vehicle of the fleet of autonomous vehicles, the autonomous vehicle along at least a portion of the respective route; and
  - simulating scheduling and dispatching of the fleet of autonomous vehicles by the scheduling system;
- determining a score associated with the scheduling and dispatching of the fleet of autonomous vehicles by the scheduling system during at least the third portion of the simulation; and
- evaluating, based at least on the score, one or more decisions by the scheduling system during at least the third portion of the simulation.

* * * * *